United States Patent
Kedia et al.

(10) Patent No.: US 11,604,803 B2
(45) Date of Patent: *Mar. 14, 2023

(54) NET CHANGE MIRRORING OPTIMIZATION ACROSS TRANSACTIONS IN REPLICATION ENVIRONMENT

(71) Applicant: International Business Machines Corporation, Armonk, NY (US)

(72) Inventors: Pravin Kailashnath Kedia, Mumbai (IN); Nirmal Kumar, Bangalore (IN); Elaine Pang, Markham (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 23 days.

This patent is subject to a terminal disclaimer.

(21) Appl. No.: 16/421,481

(22) Filed: May 24, 2019

(65) Prior Publication Data
US 2019/0278781 A1  Sep. 12, 2019

Related U.S. Application Data

(63) Continuation of application No. 15/803,170, filed on Nov. 3, 2017.

(51) Int. Cl.
*G06F 16/27* (2019.01)
*G06F 9/46* (2006.01)
*G06F 16/23* (2019.01)

(52) U.S. Cl.
CPC ............. *G06F 16/27* (2019.01); *G06F 9/466* (2013.01); *G06F 16/2358* (2019.01)

(58) Field of Classification Search
CPC ....................................................... G06F 16/27
See application file for complete search history.

(56) References Cited

U.S. PATENT DOCUMENTS

| 6,553,391 | B1 | 4/2003 | Goldring et al. |
| 2002/0165724 | A1* | 11/2002 | Blankesteijn ....... G06F 16/2308 705/1.1 |
| 2004/0193952 | A1 | 9/2004 | Narayanan |
| 2005/0192969 | A1 | 9/2005 | Haga |
| 2005/0192989 | A1* | 9/2005 | Adiba ................... G06F 16/273 |

(Continued)

OTHER PUBLICATIONS

List of IBM Patents or Applications Treated as Related.
(Continued)

*Primary Examiner* — Mohammad S Rostami
(74) *Attorney, Agent, or Firm* — Anthony Curro

(57) ABSTRACT

In optimizing net change data replication across a plurality of transactions in a replication environment, a source replication engine at a source database system: obtains a window in a source database log for the net change data replication; for a given row identifier found in the source database log, identifies an initial operation and a latest operation across the plurality of transactions within the window; compares the initial operation and the latest operation for the given row identifier to determine a net change to a row associated with the given row identifier; and stores the net change as a final operation on the given row identifier in an optimization repository for replication to a target database. The operations stored in the optimization repository are then sent to a target database system for replication to the target database.

9 Claims, 4 Drawing Sheets

(56) References Cited

U.S. PATENT DOCUMENTS

| | | |
|---|---|---|
| 2005/0193040 A1 | 9/2005 | Adiba et al. |
| 2005/0193041 A1* | 9/2005 | Bourbonnais ......... G06F 16/273 |
| 2008/0098045 A1* | 4/2008 | Radhakrishnan ....... G06F 11/00 |
| | | 707/999.203 |
| 2008/0235294 A1* | 9/2008 | Girkar ..................... G06F 16/27 |
| 2009/0037422 A1* | 2/2009 | Wong ..................... G06F 16/27 |
| 2009/0037494 A1* | 2/2009 | Wong ................. G06F 16/2358 |
| 2009/0157764 A1* | 6/2009 | Kundu ................ G06F 16/2443 |
| 2010/0030824 A1* | 2/2010 | Shang ................. G06F 11/2097 |
| | | 707/E17.044 |
| 2010/0036843 A1* | 2/2010 | MacNaughton .... G06F 16/2343 |
| | | 707/649 |
| 2011/0010392 A1* | 1/2011 | Wong ................. G06F 16/2358 |
| | | 707/776 |
| 2011/0153568 A1 | 6/2011 | Shang et al. |
| 2011/0276550 A1* | 11/2011 | Colle .................... G06F 16/214 |
| | | 707/705 |
| 2012/0054533 A1* | 3/2012 | Shi ...................... G06F 11/2097 |
| | | 714/48 |
| 2012/0150829 A1* | 6/2012 | Bourbonnais ......... G06F 16/273 |
| | | 707/703 |
| 2012/0278282 A1* | 11/2012 | Lu ........................... G06F 16/27 |
| | | 707/634 |
| 2014/0040182 A1* | 2/2014 | Gilder ..................... G06Q 40/12 |
| | | 707/602 |
| 2014/0172794 A1* | 6/2014 | Bartholoma ............ G06F 16/27 |
| | | 707/634 |
| 2015/0032694 A1* | 1/2015 | Rajamani ............ G06F 16/2358 |
| | | 707/625 |
| 2015/0088812 A1* | 3/2015 | Ziauddin ................ G06F 16/21 |
| | | 707/609 |
| 2015/0178363 A1 | 6/2015 | Spyker |
| 2015/0186486 A1* | 7/2015 | Rank ....................... G06F 16/27 |
| | | 707/610 |
| 2015/0347551 A1 | 12/2015 | Shang et al. |
| 2016/0275150 A1* | 9/2016 | Bournonnais ..... G06F 16/24575 |
| 2017/0116252 A1 | 4/2017 | Krishnaswamy et al. |
| 2017/0351585 A1* | 12/2017 | Bourbonnais ........... G06F 16/27 |
| 2018/0046643 A1* | 2/2018 | Brodt ................. G06F 16/2457 |
| 2018/0046693 A1 | 2/2018 | Brodt |
| 2018/0081767 A1* | 3/2018 | He ....................... G06F 11/1666 |
| 2018/0121511 A1* | 5/2018 | Li ......................... G06F 16/256 |
| 2018/0322157 A1* | 11/2018 | Lee ..................... H04L 67/1095 |
| 2019/0138644 A1 | 5/2019 | Kedia |
| 2020/0074119 A1* | 3/2020 | Chhabra ............... H04L 9/3247 |

OTHER PUBLICATIONS

Rinderle, S., et al., "On Deriving Net Change Information From Change Logs: The Deltalayer Algorithm", Proc. BTW 2007, Aachen, Germany, Mar. 2007.

* cited by examiner

NET CHANGE MIRRORING OPTIMIZATION ACROSS TRANSACTIONS IN REPLICATION ENVIRONMENT

BACKGROUND

The replication or mirroring of data changes from a source database to a target database can be performed either continuously or periodically according to a schedule. In a scheduled replication, a user specifies a point in a database log at which the replication is to end. The transactions at the source database logs are examined, and the net change between the last replication and the user-specified point is replicated to the target database tables. Optimization techniques exist that examine the end image of a database table row. However, these optimization techniques are limited to net changes within a single transaction.

SUMMARY

Disclosed herein is a method for net change data replication across a plurality of transactions in a replication environment, and a computer program product and system as specified in the independent claims. Embodiments of the present invention are given in the dependent claims. Embodiments of the present invention can be freely combined with each other if they are not mutually exclusive.

According to an embodiment of the present invention, in optimizing net change data replication across a plurality of transactions in a replication environment, a source replication engine at a source database system: obtains a window in a source database log for the net change data replication; for a given row identifier found in the source database log, identifies an initial operation and a latest operation across the plurality of transactions within the window; compares the initial operation and the latest operation for the given row identifier to determine a net change to a row associated with the given row identifier; and stores the net change as a final operation on the given row identifier in an optimization repository for replication to a target database. The operations stored in the optimization repository are then sent to a target database system for replication to the target database.

In one aspect of the present invention, the window is a range of entries in the source database log from a previous net change data replication to a point in the source database log at which the net change data replication is to end.

In one aspect of the present invention, when each transaction of the plurality of transactions commit, each transaction is assigned a system change number (SCN). The initial operation is an operation in the source database log associated with the given row identifier and has a lowest SCN within the window. The latest operation is an operation in the source database log associated with the given row identifier and has a highest SCN within the window.

DETAILED DESCRIPTION

Figure 1:
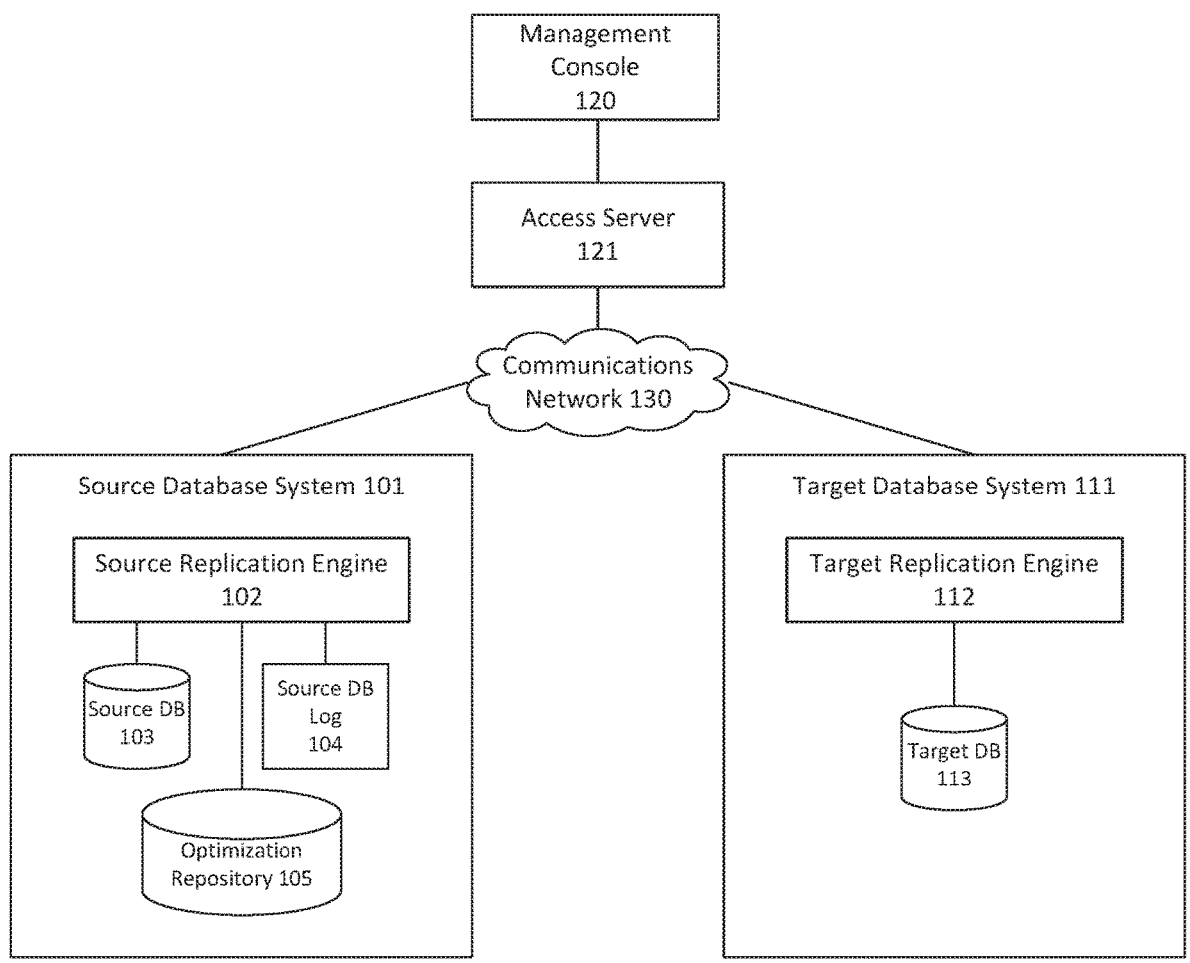
FIG. 1 illustrates a replication environment according to embodiments of the present invention.

FIG. 1 illustrates a replication environment according to embodiments of the present invention. The replication environment includes a source database system 101 and a target database system 111. The source database system 101 includes a source database 103 comprising tables, each table comprising a plurality of columns and rows. Each row is associated with a unique row identifier. As transactions are performed and committed on the data in the source database 103, the transactions and their operations are stored in a source database log 104. The target database system 111 includes a target database 113 comprising tables that mirror the tables at the source database 103. A source replication engine 102 performs the replication process as described herein and sends replication data to the target replication engine 112. In performing the replication process, optimizations are applied as described herein, and the optimized replication data are stored in an optimization repository 105. The target replication engine 112 receives the replicated data stored in the optimization repository 105 from the source replication engine 102 and modifies the target database 113 with the replicated data. Access to the replication environment over a communications network 130 is managed by an access server 121. Through the management console 120, the replication process can be managed, configured, and monitored. Configuration can include setting the replication to a net change or scheduled end mode, including a user specifies a point in time or a point in the source database log 104 at which the replication is to be performed.

Figure 2:
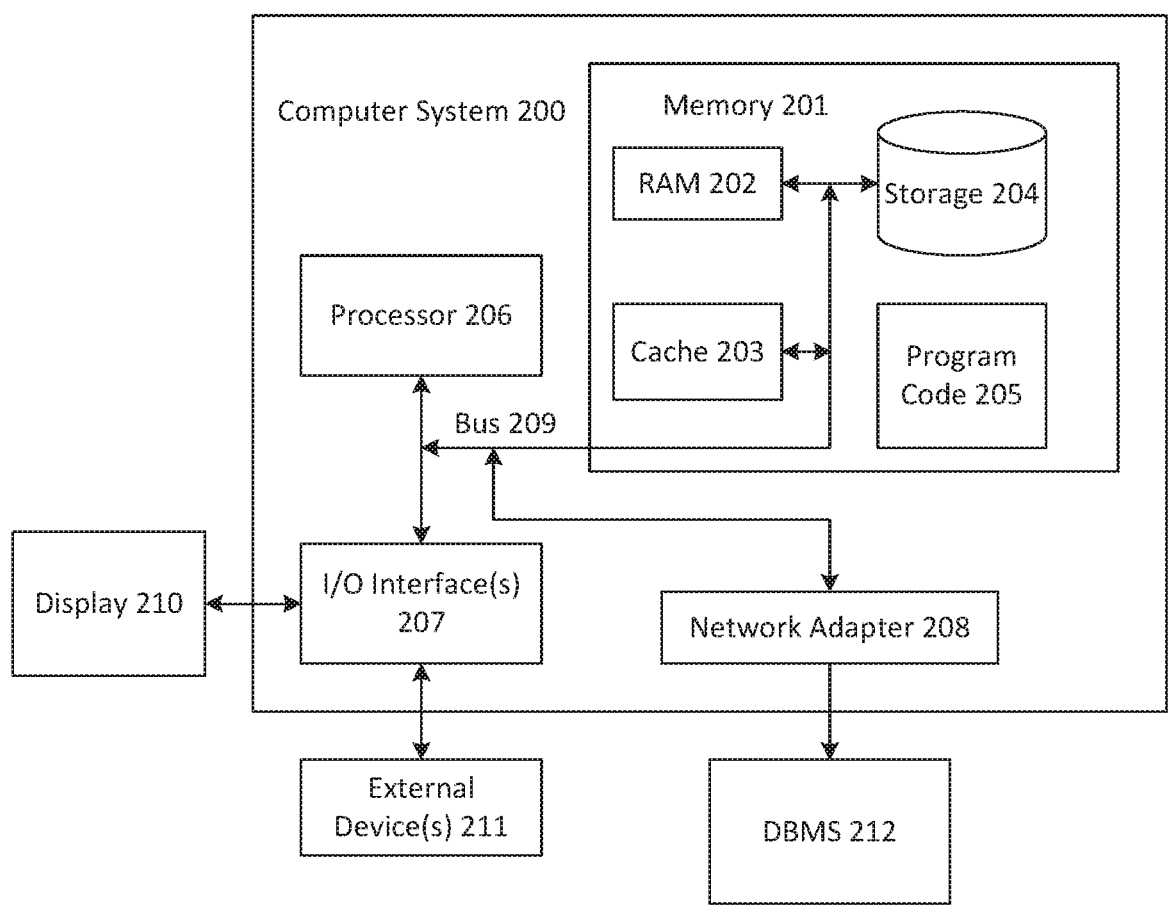
FIG. 2 illustrates a computer system, one or more of which are used to implement the embodiments of the present invention for optimizing data replication across transactions in a replication environment.

FIG. 2 illustrates a computer system, one or more of which are used to implement the embodiments of the present invention for optimizing data replication across transactions in a replication environment. The computer system 200 is operationally coupled to a processor or processing units 206, a memory 201, and a bus 209 that couples various system components, including the memory 201 to the processor 206. The bus 109 represents one or more of any of several types of bus structure, including a memory bus or memory controller, a peripheral bus, an accelerated graphics port, and a processor or local bus using any of a variety of bus architectures. The memory 201 may include computer readable media in the form of volatile memory, such as random access memory (RAM) 202 or cache memory 203, or non-volatile storage media 204. The memory 201 may include at least one program product having a set of at least one program code module 205 that are configured to carry out the functions of embodiment of the present invention when executed by the processor 206. The computer system 200 may also communicate with one or more external devices 211, such as a display 210, via I/O interfaces 207. The computer system 200 may communicate with a database management system 212 over one or more networks via network adapter 208.

Figure 3:
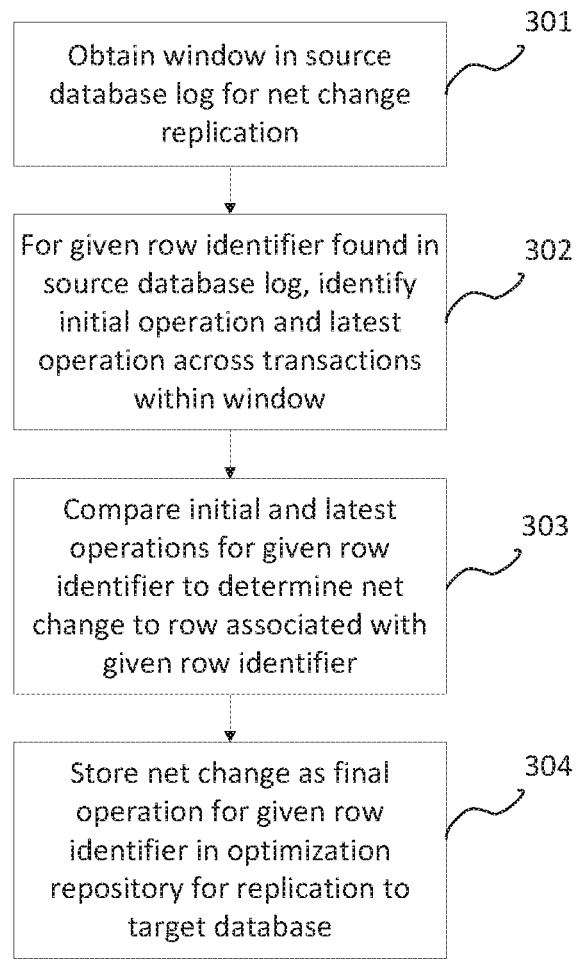
FIG. 3 illustrates a method for optimizing net change data replication across a plurality of transactions in a replication environment according to embodiments of the present invention.

FIG. 3 illustrates a method for optimizing net change data replication across a plurality of transactions in a replication environment according to embodiments of the present invention. As a prerequisite, each table in the source database 103 is associated with a table key. The source replication engine 102 groups the plurality of transactions captured in the source database log entries using the table key. The source replication engine 102 obtains the window for a scheduled or net change data replication (301). The window may be defined by configuring a point in the source database log 104 at which the replication is to end. The window is thus the range of source database log entries from the last net change replication to the configured point. The size of the window may be a configuration parameter by users and may be based on a time duration (e.g. two hours), a number of transactions (e.g. 1000 transactions), or some combination thereof. Each log entry records a transaction and its operations performed on specific source database table rows, each row being associated with a unique row identifier or table key. For a given row identifier found in the source database log 104, the source replication engine 102 identifies the initial operation and the latest operation across the plurality of transactions within the window (302). In this exemplary embodiment, each committed transaction is sequentially assigned a system change number (SCN), which is stored in the source database log entries. From the SCN's, the order in which the plurality of transactions committed can be determined. The initial operation is thus the operation with the lowest or earliest SCN within the window and involve a row associated with the given row identifier. The latest operation is the operation with the latest or highest SCN within the window and involve a row associated with the given row identifier. The source replication engine 102 then compares the initial and the latest operations for the given row identifier to determine a net change to the data in the row associated with the given row identifier (303). The source replication engine 102 stores, in the optimization repository 105, the net change as a final operation on the given row identifier for replication to the target database 113 (304). Steps 302-304 are repeated for other row identifiers. The source replication engine 102 then sends the operations stored in the optimization repository 105 to the target replication engine 112 at the target database system 111 for replication to the target database 113.

For example, assume that, for a given row identifier, 1000 UPDATE operations across multiple transactions were performed within the window, where a "salary" column value in a row with an "empid" column value=1 was changed. The initial operation is identified as the first UPDATE operation, and the latest operation is identified as the last UPDATE operation on the row (302). However, the last UPDATE operation sets the final salary value. The source replication engine 102 compares the initial and latest operations and determines that the net change is the value for the "salary" column as updated by the last operation (303). In this case, using the optimization process according to the present invention, only an UPDATE operation setting the final salary value is stored in the optimization repository 105 to be replicated to the target database 113 (305), avoiding the replication of the other 999 UPDATE operations.

For another example, assume that, for a given row identifier, an INSERT operation is performed in an initial operation within the window and a DELETE operation is performed in a latest operation within the window. The initial operation is identified as the INSERT operation, and the latest operation is identified as the DELETE operation (302). The source replication engine 102 compare the initial and the latest operations to determine that the net change is the deletion of the row associated with the given row identifier (303). Thus, neither operations is replicated to the target database 113 (304), avoiding the replication of both the INSERT and the DELETE operation, and any intervening operations, for the given row identifier within the same window.

Figure 4:
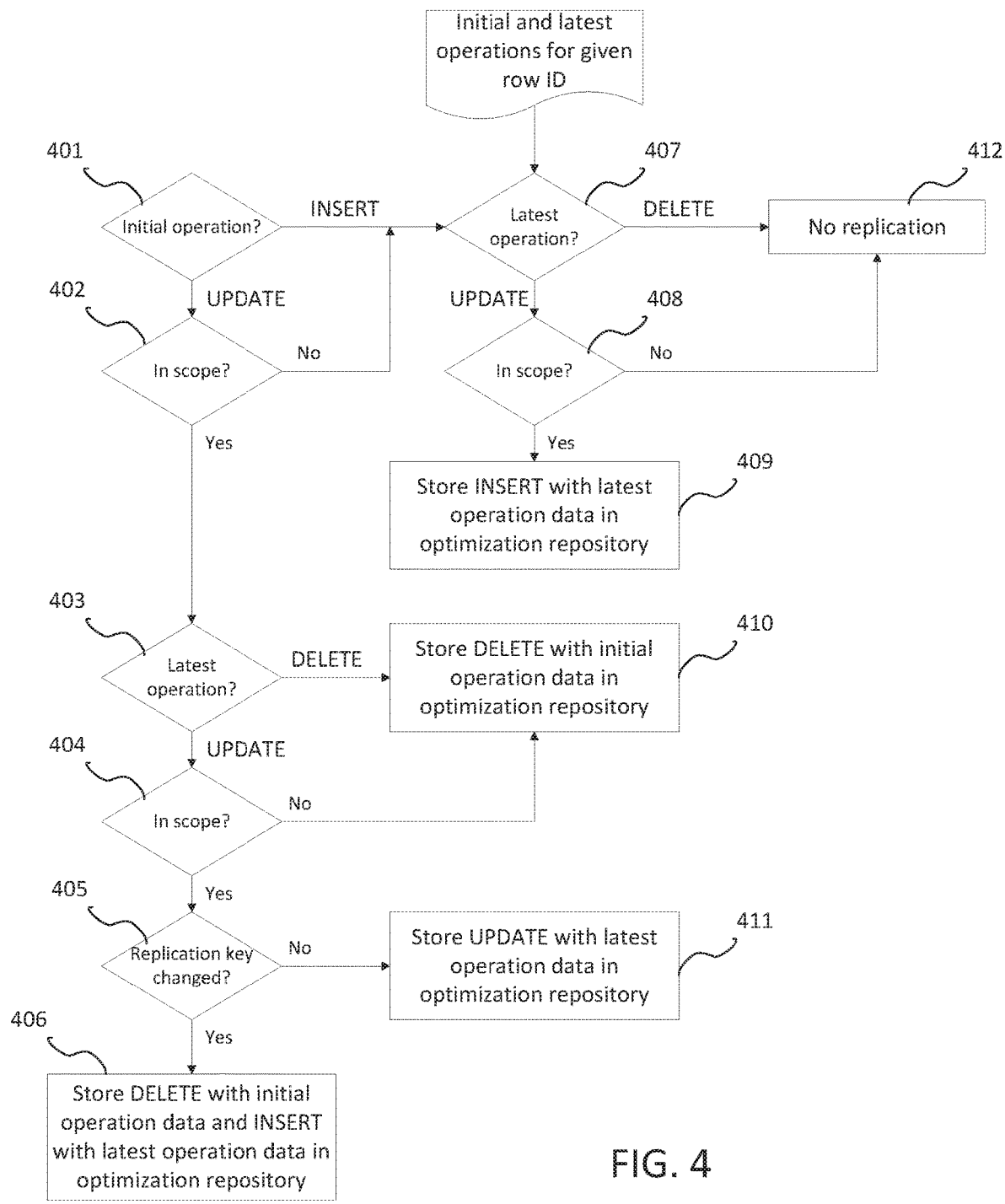
FIG. 4 illustrates in more detail the comparison of the initial and latest operations and the determination of the net change according to embodiments of the present invention.

FIG. 4 illustrates in more detail the comparison of the initial and latest operations and the determination of the net change according to embodiments of the present invention. After identifying the initial and latest operations for a given row identifier (302, FIG. 3), the source replication engine 102 determines whether the initial operation is an INSERT or an UPDATE (401). When the initial operation is an INSERT, the source replication engine 102 determines whether the latest operation is a DELETE or an UPDATE (407). When the initial operation is an INSERT and the latest operation is a DELETE, then the net change is null, and there is no replication (412). Neither operation is stored in the optimization repository 105. When the initial operation is an INSERT (401) and the latest operation is an UPDATE (407), the source replication engine 102 determines whether the latest UPDATE operation is in scope (408), i.e., whether the UPDATE is within the window. If the latest UPDATE operation is not in scope, then no replication occurs (412). If the latest UPDATE operation is in scope (408), then the net change is an INSERT of the final data of the latest operation, and an INSERT with the latest operation data is stored in the optimization repository (409).

When the initial operation is an UPDATE (401), the source replication engine 102 determines whether the initial UPDATE operation is in scope (402). If the initial UPDATE operation is not in scope, and the latest operation is a DELETE (407), then the net change is null, and there is no replication (412). If the initial UPDATE operation is not in scope (402), and the latest operation is an UPDATE (407) that is also not in scope (408), then the net change is null, and there is no replication (412). If the initial UPDATE operation is not in scope (402), and the latest UPDATE operation is in scope (408), then the net change is a match to the latest operation, and an INSERT with the latest operation data is stored in the optimization repository (409).

If the initial UPDATE operation is in scope (402), and the latest operation is a DELETE (403), then the net change is a DELETE, and a DELETE with the initial operation data is stored in the optimization repository (410). If the initial UPDATE operation is in scope (402) and the latest UPDATE operation is also in scope (403-404), then the source replication engine 102 determines whether the replication key has changed (405). If the replication key has not changed, then the net change is an update, and an UPDATE with the latest operation data is stored in the optimization repository (411). If the replication has changed (405), then to ensure that the old replication key is not replicated, a DELETE with the initial operation data and an INSERT with the latest operation data are stored in the optimization repository (406).

Embodiments of the present invention can significantly reduce the overall elapsed time for performing a net change replication. The embodiments can also significantly reduce the overall amount of data being replicated, hence reducing the workload of the entire replication pipeline from source to target. The embodiments can further increase the throughput of the net change replication. A configurable number of multiple threads may be used. By optimizing net change replication in the above described manner, the use of resources of the source replication engine 102, such as CPU cycles, memory, and disk space, may be optimized.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for optimizing net change data replication across a plurality of transactions in a replication environment, comprising:

obtaining, by a source replication engine at a source database system, a window in a source database log for the net change data replication, the window comprising a plurality of entries in the source database log recording a plurality of transactions for a net change data replication, each transaction comprising one or more operations on one or more table rows associated with one or more row identifiers;

for a given row identifier found in the plurality of entries, identifying, by the source replication engine, a first operation of a first transaction of the plurality of transactions, the first operation being an earliest in the window performed on a table row associated with the given row identifier and the first operation is associated with the given row identified by the given row identifier and has a lowest system change number (SCN);

for the given row identifier found in the plurality of entries, identifying a second operation of a second transaction of the plurality of transactions in the given row identified by the given row identifier, the second operation being a latest operation in the window performed on the table row associated with the given row identifier and the second operation is associated with the given row identified by the given row identifier in the window and has a highest SCN;

comparing, by the source replication engine, only the first operation with the lowest SCN and the second operation in the given row identified by the row identifier with the highest SCN, wherein the comparing of only the first operation and the second operation includes determining a type of the first operation and a type of the second operation;

based on the comparison, determining a final operation with operation data that will result in the net change data operation to the row associated with the given row identifier between the first operation and the second operation; and storing, by the source replication engine, only the final operation with the operation data in an optimization repository at the source database system for replication to a target database in a target database system;

for each other given row identifier found the plurality of entries, repeating the identifying of the first operation with the lowest SCN number, the identifying of the second operation with the highest SCN number, the comparing of the first operation and the second operation, and the storing of only the final operation with the operation data; and sending, by the source replication engine to the target database system, the final operations with the operation data in the optimization repository for the net change data replication to the target database.

2. The method of claim 1, wherein the comparing of the first operation and the second operation, and the determining of the final operation with the operation data that will result in the net change to the row associated with the given row identifier between the first operation and the second operation comprises:

determining that the first operation is a first INSERT operation or a first UPDATE operation that is not in scope of the window;

when further the second operation is a DELETE operation or a second UPDATE operation that is not in scope of the window, determining that the net change is null; and when further the second operation is a third UPDATE operation that is in scope of the window, determining that the final operation comprises a second INSERT operation with the operation data comprising data of the second operation and storing the second INSERT operation with the data of the second operation in the optimization repository.

3. The method of claim 1, wherein the comparing of the first operation and the second operation, and the determining of the final operation with the operation data that will result in the net change to the row associated with the given row identifier between the first operation and the second operation comprises:

determining that the initial operation is a first UPDATE operation that is in scope of the window;

determining that the second operation is a first DELETE operation or a second UPDATE operation that is not in scope of the window;

in response to determining that the first operation is the first UPDATE operation that is in scope of the window and that the second operation is the first DELETE operation or the second UPDATE operation that is not in scope of the window, determining that the final operation comprises a second DELETE operation with the operation data comprising data of the first operation; and storing only the second DELETE operation with the data of the first operation in the optimization repository.

4. The method of claim 1, wherein the comparing of the first operation and the second operation, and the determining of the final operation with the operation data that will result in the net change to the row associated with the given row identifier between the first operation and the second operation comprises:

determining that the first operation is a first UPDATE operation that is in scope of the window;

determining that the second operation is a second UPDATE operation that is in scope of the window;

in response to determining that the first operation is the first UPDATE operation that is in scope of the window and that the second operation is the second UPDATE operation that is in scope of the window, determining whether a replication key has changed;

when the replication key has changed, determining that a first final operation comprises a DELETE operation with first operation data comprising data of the first operation and an INSERT operation with second operation comprising data of the first operation and storing only the DELETE operation with the data of the first operation and the INSERT operation with the data of the second operation in the optimization repository; and when the replication key has not changed, determining that the final operation comprises a third UPDATE operation with the operation data comprising the data of the second operation and storing only the third UPDATE operation with the data of the second operation in the optimization repository.

5. The method of claim 1, wherein the window comprises a range of entries in the source database log from a previous net change data replication to a point in the source database log at which the net change data replication is to end, the window defined by configuring the point in the source database log where the net change data replication is to end.

6. The method of claim 1, wherein the plurality of transactions comprises one or more operations between the first operation and the second operation.

7. The method of claim 1, wherein the data replication occurs continuously or periodically according to a schedule.

8. The method of claim 1, wherein the source database log records transactions as transactions are performed and committed on data in the source database.

9. The method of claim 1, wherein the target database system includes a target database comprising tables that mirror tables in a source database associated with the source database system.

* * * * *